United States Patent [19]
Mohon et al.

[11] Patent Number: 4,526,545
[45] Date of Patent: Jul. 2, 1985

[54] DIURNAL EFFECTS SIMULATOR

[75] Inventors: Windell N. Mohon, Athens, Ala.; Jimmy H. Burns, Maitland, Fla.

[73] Assignee: The United States of America as represented by the Secretary of the Navy, Washington, D.C.

[21] Appl. No.: 493,860

[22] Filed: May 12, 1983

[51] Int. Cl.³ .............................................. G09B 9/00
[52] U.S. Cl. ....................................... 434/38; 434/21; 434/43
[58] Field of Search ..................... 434/38, 20, 21, 69, 434/43; 273/348.1

[56] References Cited

U.S. PATENT DOCUMENTS 3,283,418 11/1966 Brewer et al. ....................... 434/69
3,670,426 6/1972 Horowitz ............................. 434/43
4,001,499 1/1977 Dowell ................................ 434/43
4,193,211 3/1980 Dotsko ................................. 434/38
4,470,818 9/1984 Marshall ........................ 273/348.1

Primary Examiner—Richard C. Pinkham
Assistant Examiner—Leo P. Picard
Attorney, Agent, or Firm—Robert F. Beers; Robert W. Adams

[57] ABSTRACT

A vehicle simulator for training purposes enables the trainee to observe diurnal effects through a simulated thermal sight by the utilization of a variety of paints whose pigments are selected based on their reflectivity to known wavelengths of light. A lamp bank is provided to illuminate a modelboard with various hues so painted as to provide reflectivity corresponding to thermal images. A monochrome television camera mounted on a movable gantry supplies images of said modelboard to a display in the vehicle simulator.

1 Claim, 3 Drawing Figures

DIURNAL EFFECTS SIMULATOR

FIELD OF THE INVENTION

This invention is related to the field of training devices and particularly to such devices as require simulated terrain display. More particularly, the invention is related to simulated display devices located within a vehicle which yield a particular image of the vehicle's surroundings. In even greater detail, the present invention may be described as a trainer display utilizing a specialized model board for special effects.

DESCRIPTION OF THE PRIOR ART

There exists a number of simulators which use a variety of techniques to display the out-of-vehicle scene. Many of these, such as U.S. Pat. Nos. 4,177,579 and 4,162,582, endeavor to show the simulated scenario as if viewed through a window or aircraft canopy. Such devices are generally more complex and do not perform the same function as the current invention which simulates a display provided within a vehicle.

U.S. Pat. No. 3,999,007 provides an internal display; however, it is by no means otherwise similar to the instant invention, inasmuch as it is a device for assisting in the actual landing of an aircraft, whereas the instant invention is a training device.

U.S. Pat. No. 3,949,490 provides a multi-display trainer which projects images from slides onto an internal display. Inasmuch as an internal display which could simulate FLIR is presented, the device is similar to the present invention; however, the manner and principle of image generation and operation are considerably different therebetween.

SUMMARY OF THE INVENTION

The instant invention is a training device developed primarily for use as a simulated Forward Looking Infrared Reconnaissance (FLIR) display. Military application of FLIR is relatively new, therefore its use and characteristics are somewhat unknown among the servicemen who will be called on to use FLIR devices. A variety of techniques are being explored to simulate FLIR, including computer generated imagery, film, video disc, and modelboard. The current invention utilizes a modelboard whereupon selected cultural and environmental features are disposed. The modelboard and features are selectively painted with pigment determined to have reflectance qualities at particular light wavelength which simulate the diurnal effects displayed by FLIR imagery. An illumination source of variable wavelength is provided to enhance the reflectivity effect and the terrain represented by the modelboard is viewed by the trainee via a monochromatic sensing device which simulates the motion of the trainee's vehicle.

The primary object of this invention is to provide an internal display for a trainer vehicle which exhibits a realistic simulation of a FLIR.

Another object of the invention is to provide such a FLIR with the capability of presenting realistic diurnal effects.

The features of the invention desired to be protected are set forth in the appended claims. The invention itself, together with further objects and advantages thereof, may best be understood by referring to the following description taken in conjunction with the appended drawings.

DESCRIPTION OF A PREFERRED EMBODIMENT

Figure 1:
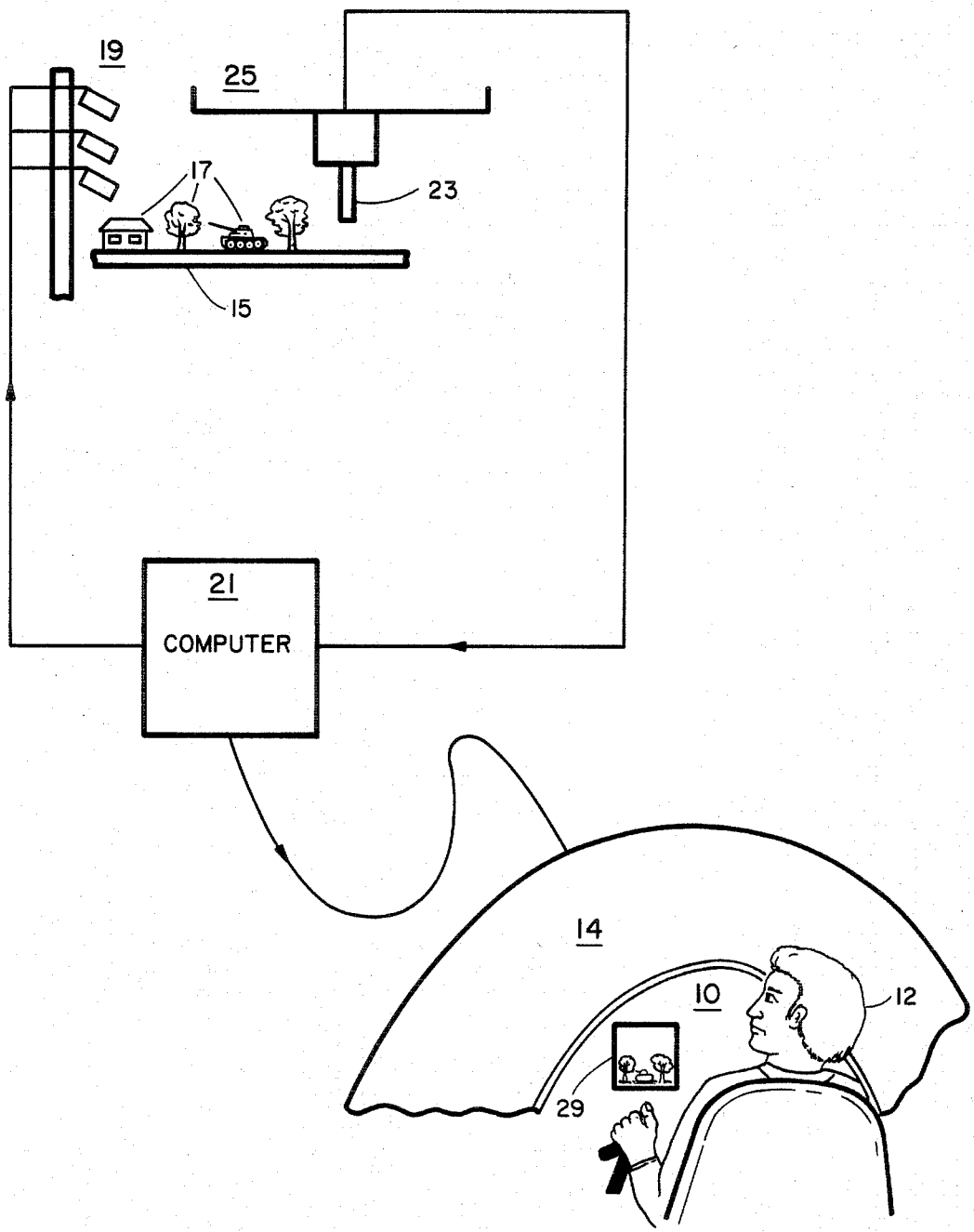
FIG. 1 is a view of the invention in relation to a cockpit trainer.

FIG. 1 illustrates a complete system in which the instant invention may be used. A simulated vehicle shown generally at 10 is provided, which may simulate an airplane, helicopter, ship, tank, truck, or any other. Trainee 12 is seated within vehicle 10 and is presented a scene 14 of the external world as viewed through the vehicle windows or canopy, as the case may be. Obviously, the particular trainer vehicle, its display, operating parameters, and capabilities are a matter of choice; their illustration herein serves merely to provide the environment of use of the instant invention, which in FIG. 1 is shown as the combination of a modelboard 15 whereupon there are disposed a plurality of environmental and cultural features as well as selected military apparatus, all of which are scale models of their real world counterparts. Each of said plurality of features and apparatus is painted with a particular pigment as hereinafter described. A bank 19 of lamps illuminates modelboard 15. Each of said lamps in bank 19 emits a particular color or wavelength of light and each is independently variable in intensity. A computer 21 controls, among other things, the variation of intensity and illumination of the individual lamps of bank 19 and, thus, the hue coat on modelboard 15.

An optical probe 23 is mounted on a gantry 25 and is movably positioned above the surface of modelboard 15 so as to sense light reflected therefrom. Probe 23 is a monochromatic sensor such as a black and white TV camera. Gantry 25 provides for movement of the probe 23 about the surface of modelboard 15 in correspondence to the simulated motion of vehicle 10, in accordance with the inputs of trainee 12.

The output of probe 23 is fed to computer 21, where it may be enhanced, or merely transmitted to display 29. As shown in FIG. 1, display 29 would be a CRT located inside vehicle 10. Alternatively, and dependent upon the manner of presenting scene 14, display 29 may be incorporated into scene 14 such as by dedicating a portion of a CIG to display 29.

Figure 2:
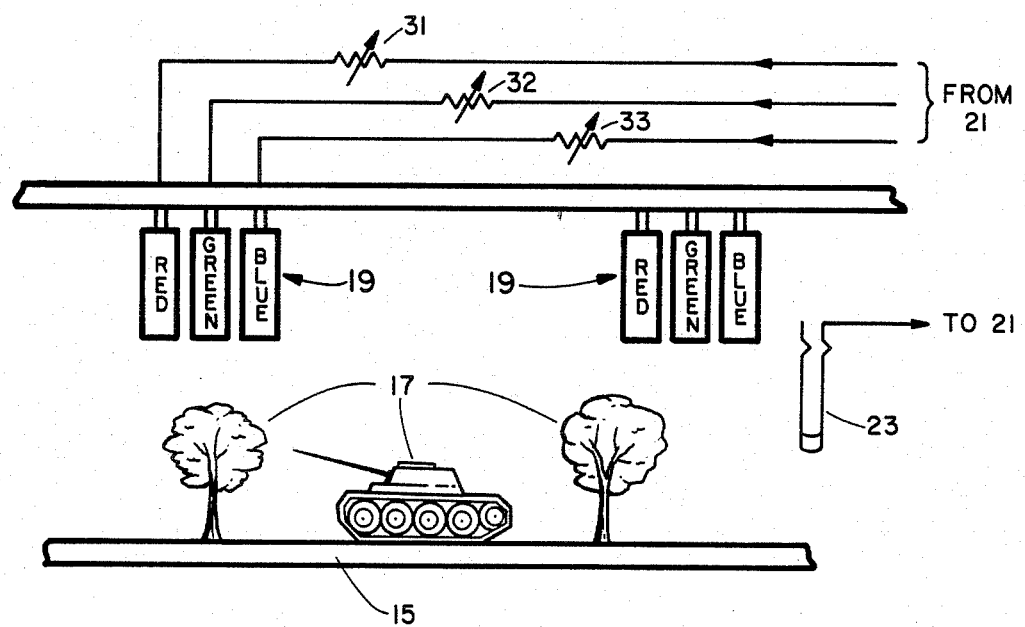
FIG. 2 is a block diagram of the invention wherein the light source is a bank of multicolored lamps.

FIG. 2 illustrates in greater detail how the diurnal effects are produced on modelboard 15. The various paint colors used on modelboard 15 and the plurality of environmental and cultural features 17 are ordinary pigment paints; however, their colors are selected from a reflectance chart very carefully, such that when the hue of lighting from bank 19 varies, as from red to blue, then the apparent reflectance of the paint varies also. The FLIR is normally looking for variations in emitted thermal energy throughout the day in order to distinguish various targets. The change in apparent reflectance, due to hue change as described above, produces the same effect to a black and white television camera in probe 33 over modelboard 15 as does real world thermal emissivity to a real FLIR device.

The key to the operation of the apparatus is: (1) correctly selecting the pigment for use on modelboard 15, and (2) correctly controlling the wavelength mixture from lamp bank 19. The first is accomplished by comparing paint reflectance charts against object emissivity throughout the 24-hour day or any part thereof, and selecting the particular pigment whose characteristic reflectivity across the spectrum most suits the object. For example, an object which stays hot all day might be painted white; an object painted red would appear "hot" under red illumination and "cool" under blue illumination. The correct wavelength required for the particular diurnal scenario would be controlled by computer 21 by controlling rheostats 31-33 which energize the lamps of bank 19 to create the proper hue.

Figure 3:
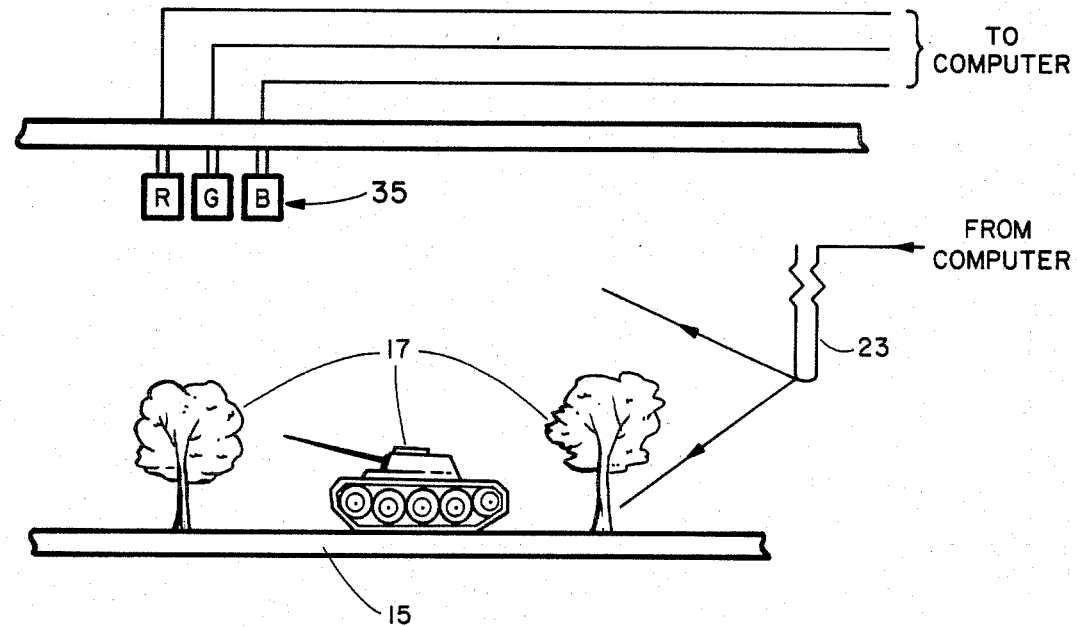
FIG. 3 is a block diagram of the invention wherein the light source is a plurality of lasers of different wavelength outputs.

FIG. 3 illustrates the invention wherein probe 23 is a scanned laser camera. In this case the illumination comes from multicolor laser beams projected from probe 23 onto modelboard 15. The reflected light is then detected by an array of photomultiplier tubes 35 filtered to the wavelength corresponding to the laser beams. The amount of each color of laser light projected determines the apparent diurnal condition and is therefore controlled through a modulator 37 and computer 231.

While a particular embodiment of the invention has been shown and described herein, it is not intended that the invention be limited to such disclosure, but that changes and modifications can be made and incorporated within the scope of the appended claims.

What is claimed is:

1. Apparatus for simulating diurnal effects in a military training device for operational infrared optical equipment, comprising:

a light source composed of first, second and third separately modulated lasers providing red, green and blue illumination, respectively, wherein the intensity of each said laser is selectably variable;

a modelboard illuminated by said light source, having a combination of terrain features simulated in miniature and miniature replicas of military equipment, wherein said replicas simulate varying operational military equipment that are identifiable by their respective thermal signatures, and wherein selected surfaces of said replicas are coated with one or more various pigments that are predeterminedly responsive to the illumination from one or more of said lasers such that by choosing the pigments of said coatings, the surfaces to be coated by each said coating, and the intensity of the illumination from each said laser, the visual appearance of said replicas may be made to simulate the thermal signatures of said operational equipment, respectively, as said signatures would be perceived with the use of thermal sensitive equipment in the operational military environment;

first, second and third photomultiplier tubes positioned to receive reflected light from said model board illuminated by said light source, wherein said first photomultiplier tube includes a filter so as to sense reflected illumination from said red laser, said second photomultiplier tube includes a filter so as to sense reflected illumination from said green laser, and said third photomultiplier tube includes a filter so as to sense reflected illumination from said blue laser;

computer means coupled to said light source and to said first, second and third photomultiplier tubes, for controlling the intensity of said red laser, the intensity of said green laser and the intensity of said blue laser and for processing the responses of said first, second and third photomultiplier tubes for visual presentation;

visual means coupled to said computer means for presenting images of said features and said replicas from the responses of said first, second and third photomultiplier tubes;

such that said visual presentation is an accurate simulation of said diurnal effects for training.

* * * * *